United States Patent [19]
Kobayashi et al.

[11] Patent Number: 6,095,220
[45] Date of Patent: Aug. 1, 2000

[54] OVERCOAT FIXING DEVICE

[75] Inventors: Kakehito Kobayashi, Nirasaki; Kenichi Yui, Koufu, both of Japan

[73] Assignee: Nisca Corporation, Minamikoma-gun, Japan

[21] Appl. No.: 09/102,387

[22] Filed: Jun. 22, 1998

[30] Foreign Application Priority Data

Jun. 23, 1997 [JP] Japan ..................... 9-183128
Jun. 23, 1997 [JP] Japan ..................... 9-183129

[51] Int. Cl.$^7$ ........................................ B32B 33/00
[52] U.S. Cl. ..................... 156/540; 156/234; 156/238
[58] Field of Search ..................... 156/230, 234, 156/238, 311, 312, 540

[56] References Cited

U.S. PATENT DOCUMENTS 5,673,076 9/1997 Nardone et al. ............... 156/230 X
5,783,024 7/1998 Forkert .

FOREIGN PATENT DOCUMENTS

| 61-066633 | 4/1986 | Japan . |
| 62-44855 | 3/1987 | Japan . |
| 07097117 | 4/1995 | Japan . |
| 07276836 | 10/1995 | Japan . |

*Primary Examiner*—Curtis Mayes
*Attorney, Agent, or Firm*—Kaensaka & Takeuchi

[57] ABSTRACT

An overcoat fixing device of the application fixes a coat film on a front surface of a recording medium by heating. The overcoat fixing device is formed of a transferring device for transferring the recording medium along a transferring path, a fixing device provided in the transferring path and fixing the coat film to the recording medium, and a pressing device provided in the transferring path away from the fixing device and pressing one surface of the recording medium on which the coat film is fixed. The pressing device presses the recording medium with the coat film sent from the fixing device by the transferring device for a predetermined time while stopping at a predetermined position. Accordingly, bending of the recording medium can be corrected.

10 Claims, 18 Drawing Sheets

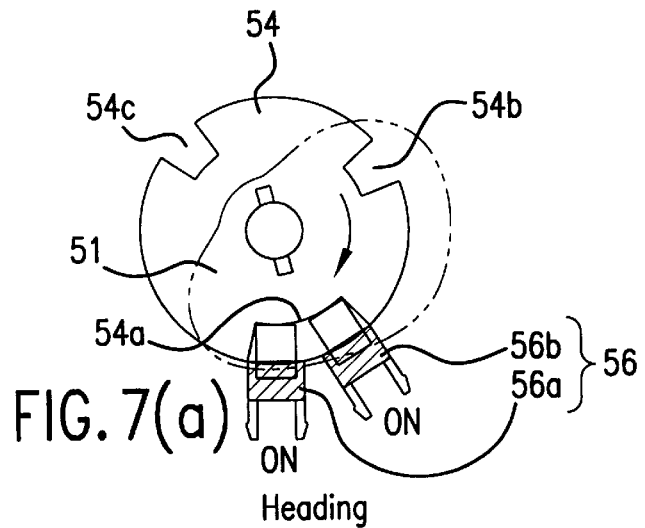
FIG. 7(a) Heading
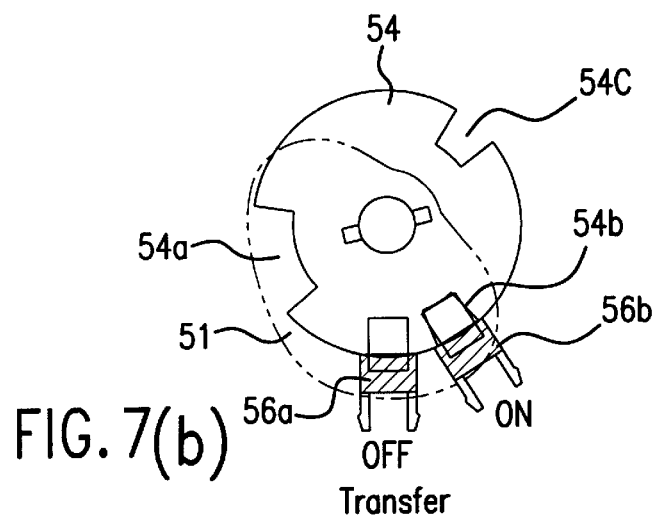
FIG. 7(b) Transfer
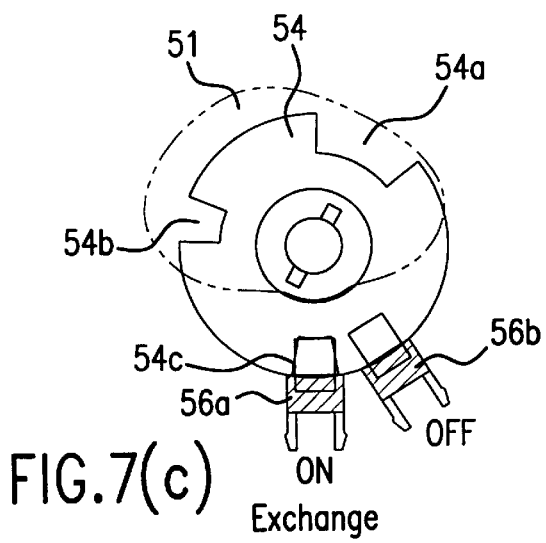
FIG. 7(c) Exchange

OVERCOAT FIXING DEVICE

BACKGROUND OF THE INVENTION AND RELATED ART STATEMENT

The present invention relates to an overcoat fixing device for heat-fixing a coat film for protection on a front surface of a record medium including a card, for example, an identification card, such as a company staff I.D. card or a student I.D. card; a bank card for bank related matters; or a multipurpose IC card, and a transfer paper outputted by an image forming device.

In a field of recent computer image processing, by using image information, character information or the like, which is retrieved from a computer, an identification card or the like is issued by a sublimation type full-color printer. Identification characters, such as "name of a company", "name of a holder", and "affiliation", are printed together with a picture of the holder or the like on a front surface of the card, and a magnetic recording layer which is magnetic-coded is formed on a reverse surface of the card.

In the card, such as this identification card, in order to prevent falsifying or altering the I.D. characters or the holder's picture on the front surface of the card, the front surface of the card is often covered by a substantially transparent film including specific patterns. As this film, for example, a hologram coat film is used.

FIG. 1(a) is a section view showing a sectional structure of a film ribbon, and FIG. 1(b) is a section view showing a thermally cut condition of the film ribbon.

As shown in FIGS. 1(a) and 1(b), a film ribbon Y1 sold in the market is normally formed of a thin and substantially transparent coat film 202 with a thickness of approximately 0.006 mm provided on a transparent carrier 201, and a thickness of the film ribbon Y1 as a whole is approximately 0.025 mm. The coat film 202 is formed of a surface protection layer 202a, a hologram layer 202b, and an adhesive layer 202c, which are provided in this order.

This ordinary film ribbon Y1 is sold in a shape of a film ribbon having a larger width than a width of the card. Then, in a condition of being laminated on a card X, the hologram film ribbon Y1 is heated by heating means. Thus, with respect to the heated area A, the coat film 202 is peeled off the transparent carrier 201, and adhered to a front surface of the card X by the adhesive layer 202c. Accordingly, on the entire front surface of the card X, only the coat film 202 is thermally cut and transferred.

As described above, when each film is adhered to the card, due to a heat-shrinking rate in case of thermally pressing or cooling each material, the card is bent, so that manufactures with satisfying quality have not been available.

The present invention is made in view of the aforementioned problem, and an object of the invention is to provide an overcoat fixing device in which bending of a recording medium can be surely corrected in case various coat films are respectively over-coated on the recording medium, such as a card.

SUMMARY OF THE INVENTION

The present invention is made to achieve the above object, and is to provide an overcoat fixing device, in which a coat film formed of at least one film layer and an adhesive layer is laminated on a front surface of a recording medium to be heated so that the coat film is fixed on the front surface of the recording medium. The overcoat fixing device includes transferring means for transferring the recording medium, on which the coat film is fixed, to a predetermined position to stop the same; and pressing means for pressing one surface of the recording medium transferred to the predetermined position so that the recording medium, which is being stopped at the predetermined position, is pressed by the pressing means for a predetermined time.

BRIEF DESCRIPTION OF THE DRAWINGS

FIGS. 7(a)–(c) are views showing relative postures between each detected position of the heat roller and the control cam;

DETAILED DESCRIPTION OF PREFERRED EMBODIMENTS

Hereinafter, embodiments of the present invention are explained by referring to the figures.

Figure 1A:
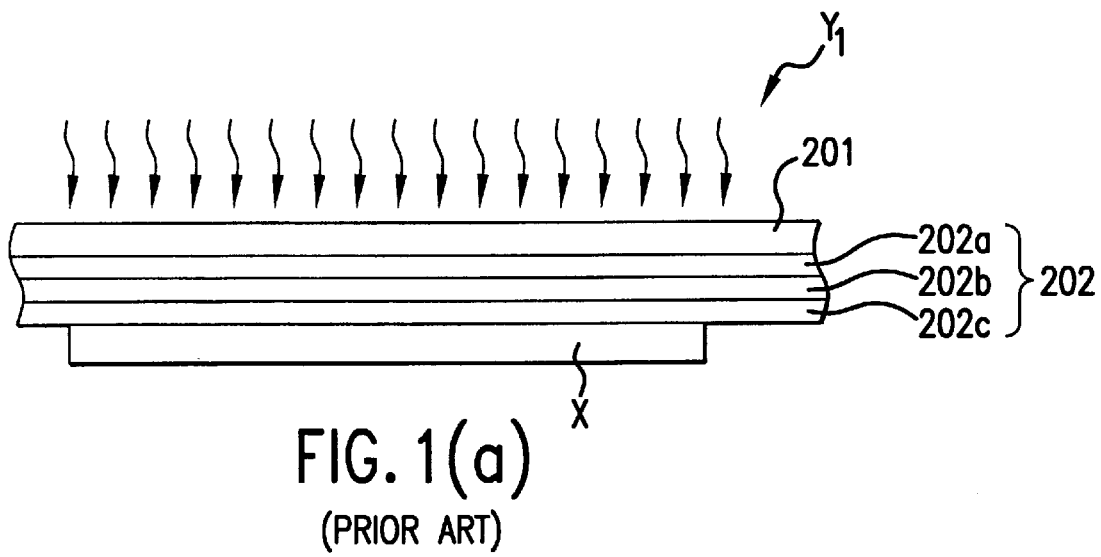
FIG. 1(a) is a sectional view showing a sectional structure of a coat film.
Figure 1B:
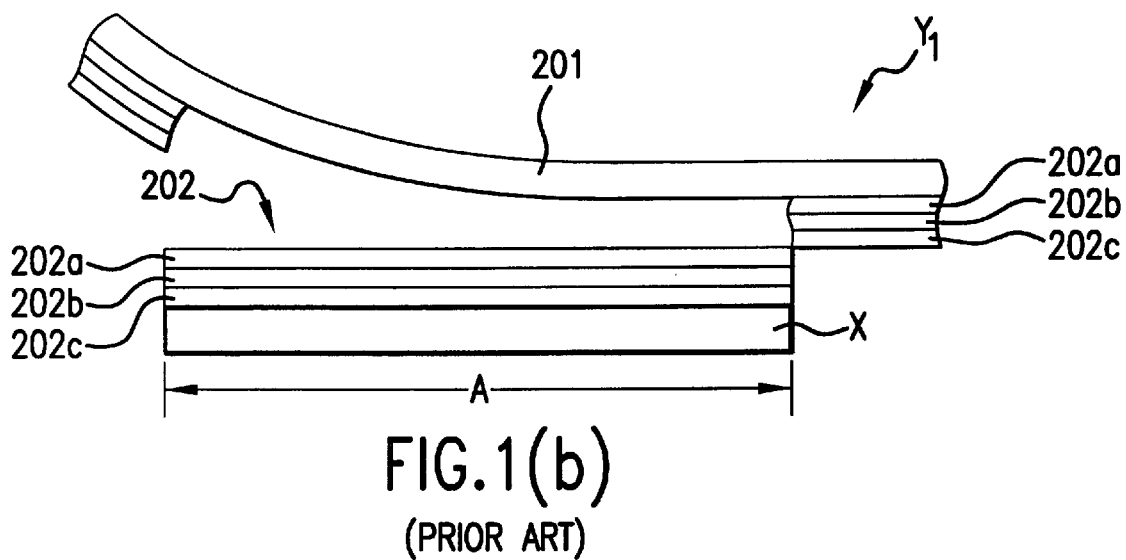
FIG. 1(b) is a sectional view showing a thermally cut condition of the coat film.
Figure 2:
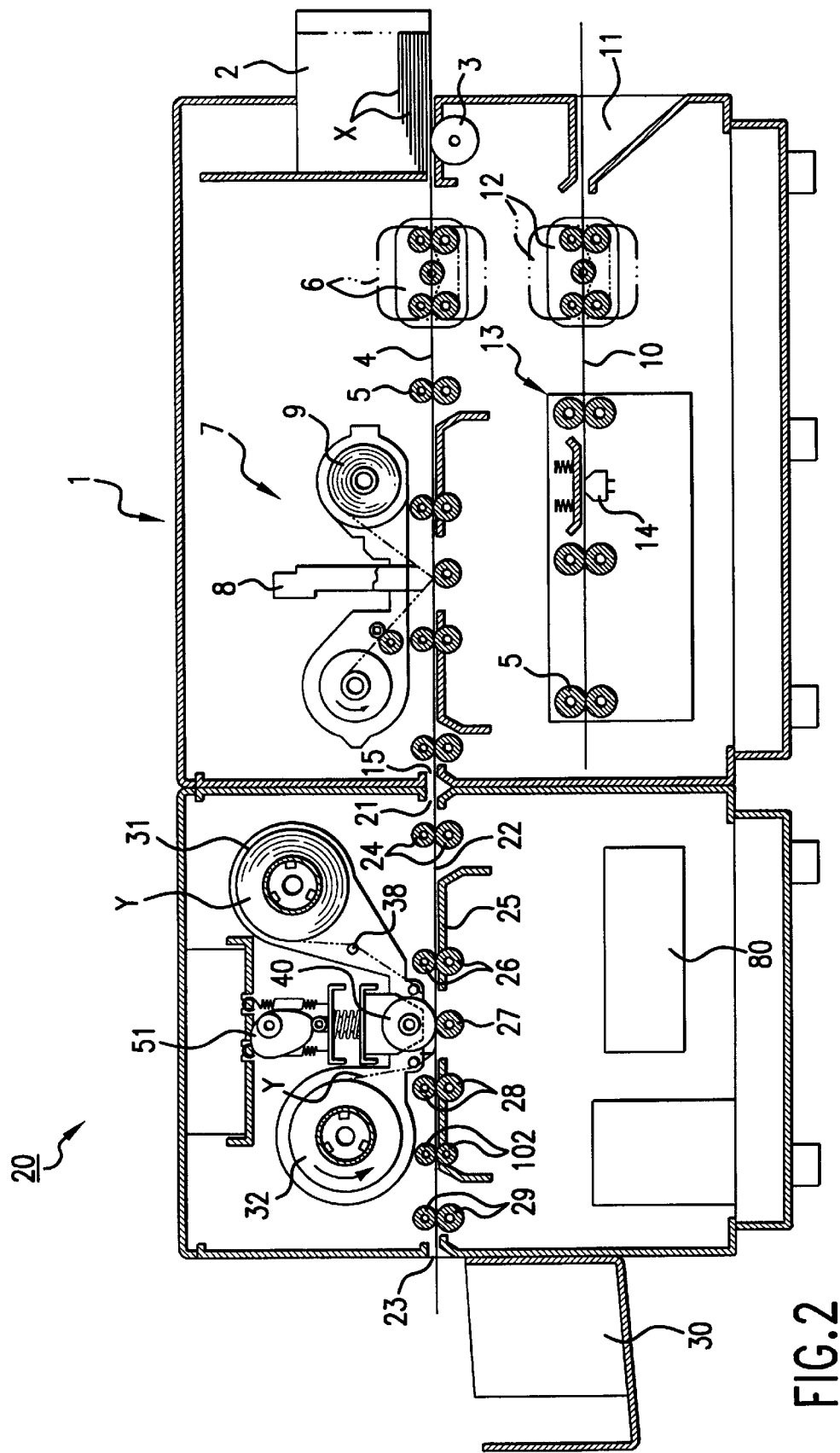
FIG. 2 is a whole sectional view showing a condition that an overcoat fixing device according to the present invention is connected to a printer.

FIG. 2 is a whole sectional view showing a condition that an overcoat fixing device according to the present invention is connected to a printer.

An overcoat fixing device 20 is constructed to be connected, as an option device, to a sublimation type full-color printer 1. That is, firstly, in the sublimation type full-color printer 1, identification characters and a holder's picture, which are necessary for issuing a card X, are printed on a front surface of a non-recorded card, and then magnetic-coded information is written in a magnetic recording layer provided on a reverse surface of the non-recorded card. Then, the obtained card X is sent to the overcoat fixing device 20, and the front surface thereof is covered by a film ribbon Y such as a hologram coat film.

Next, the aforementioned respective parts are explained more specifically.

(1) Sublimation Type Full-color Printer 1

The sublimation type full-color printer 1 shown in FIG. 2 includes a card stacker 2 and a card rejection port 11 at one side thereof. Also, in correspondence with respective heights of a supply section of the card stacker 2 and the card rejection port 11, the printer 1 is vertically provided with two upper and lower card transfer paths 4, 10 therein. One of the paths is the first path 4 which extends from a supply roller 3 located right under the card stacker 2 to an ejection port 15 formed as a connection port on the other side; and the other path is a second path 10 which is provided below the first path 4 and is continued to the rejection port 11. These paths 4 and 10 are formed by providing, in order, required pairs of transfer rollers 5 having an interval therebetween.

Record-unprocessed cards X placed in a stacked condition on the card stacker 2 are sent out one by one by the supply roller 3 to the first path 4. In the first path 4, there are disposed a first direction switcher 6 which is rotatable by 90 degrees as one unit in one direction, and a heat-transfer type printer unit 7 which includes a heat recording head 8 and a sublimation type color ribbon 9. The first direction switcher 6 in a condition of holding the card X changes the direction by 90 degrees to be vertical, so that the card X can be transferred to or received from a second direction switcher 12.

The unprocessed card X passes through the first direction switcher 6, and at the printer unit 7, the heat recording head 8 and the sublimation type color ribbon 9 print the identification characters in black and the holder's picture in color on the surface thereof based on image information.

On the other hand, in the second path 10, there are disposed the second direction switcher 12 which is rotatable by 90 degrees in a clockwise direction, or 90 degrees in a counterclockwise direction from the horizontal condition, and an encoder unit 13 including a magnetic recording head 14. The second direction switcher 12 is spaced away from the first direction switcher 6 vertically but located at the same position, and in the condition of holding the card X, the second direction switcher 12 changes the direction by 90 degree to be vertical, so that the card X can be transferred to or received from the first direction switcher 6.

The card X, on which the identification characters and the holder's picture are recorded in the printer unit 7, is reversely sent in the first path 4, and transferred from the first direction switcher 6 to the second direction switcher 12. Then, the card X is transferred in the second path 10 from the second direction switcher 12 to the encoder unit 13, wherein magnetic-coded information is recorded on the magnetic recording layer of the reverse surface of the card X by the magnetic recording head 14.

The card X, on which magnetic recording is finished, is returned to the second direction switcher 12, and transferred to the first direction switcher 6 to proceed to the first path 4.

Then, after the card X, which has been transferred to the first path 4 and subjected to the print-recording and magnetic-recording as described above, passes through the printer unit 7, without processing or with print-processing onto the reverse surface thereof, the card X is supplied to the overcoat fixing device 20 from the ejection port 15 formed at an end part of the first path 4.

(2) Overcoat Fixing Device 20

In the following, the overcoat fixing device is explained by referring to FIG. 3 through FIG. 7(c) and FIG. 13.

The overcoat fixing device 20 includes an inlet 21 provided on one side thereof as a communication port with respect to the ejection port 15, and an ejection port 23 on the other side thereof. Between the inlet 21 and the ejection port 23, as constituents of a transfer path 22, a pair of inlet side rollers 24, a pair of first capstan rollers 26, a platen roller 27, a pair of second capstan rollers 28, and a pair of ejection side rollers 29 are disposed in order. Then, correcting rollers 102 for correcting bend of a coated card are provided between the pair of the second capstan rollers 28 and the pair of the ejection side rollers 29.

Also, the overcoat fixing device is provided with a passage guide plate 25 between the pair of the inlet side rollers 24 and the pair of the ejection side rollers 29, and the other side of the overcoat fixing device 20 is provided with an ejection stacker 30 for stacking the cards X which are ejected from the ejection port 23 after overcoat process is finished.

In the transfer path 22, a supply bobbin part 31 for supplying a film ribbon Y is disposed on the upper stream side of the card transferring direction than the platen roller 27, and on the downstream side thereof, a take-up bobbin part 32 for taking up the film ribbon Y is located. The supply bobbin part 31 and the take-up bobbin part 32 form a supply roll and a take-up roll by winding both ends of the film ribbon Y around the respective bobbins 33 thereof. Each of the bobbins 33 is freely detachably attached to a bobbin holder 35, so that the film ribbon Y can be exchanged. A type of the exchanged film ribbon Y is a film, such as the aforementioned normal hologram coat film, a reinforced protection coat film, or a hologram coat film including specific images, and widths of these films are set in a common dimension.

Above the platen roller 27, guide pins 36, 37 are disposed at two points in a front and rear direction thereof, and the film ribbon Y pulled out from the supply bobbin part 31 is guided by the guide pins 36, 37 in a condition of being extended traversely above the platen roller 27. Also, a guide pin 38 is disposed between the supply bobbin part 31 and the guide pin 36, such that the film ribbon Y can be positioned by the guide pin 38.

Above the transfer path 22, between the supply bobbin part 31 and the take-up bobbin part 32, there is disposed a heat roller 40 as heat fixing means to face the platen roller 27. The heat roller 40 includes a built-in halogen lamp 41 as a heater, and both end parts of the heat roller 40 are rotatably supported by legs of a support bracket 42. Against the periphery of the heat roller 40, a temperature detector 39 formed of a thermistor abuts elastically.

Also, the heat roller 40 is suspended from an upper part by a pending swing mechanism 43 to be able to swing elastically in a vertical direction, and a vertical position thereof can be changed by an ascending and descending drive mechanism 50.

Figure 4:
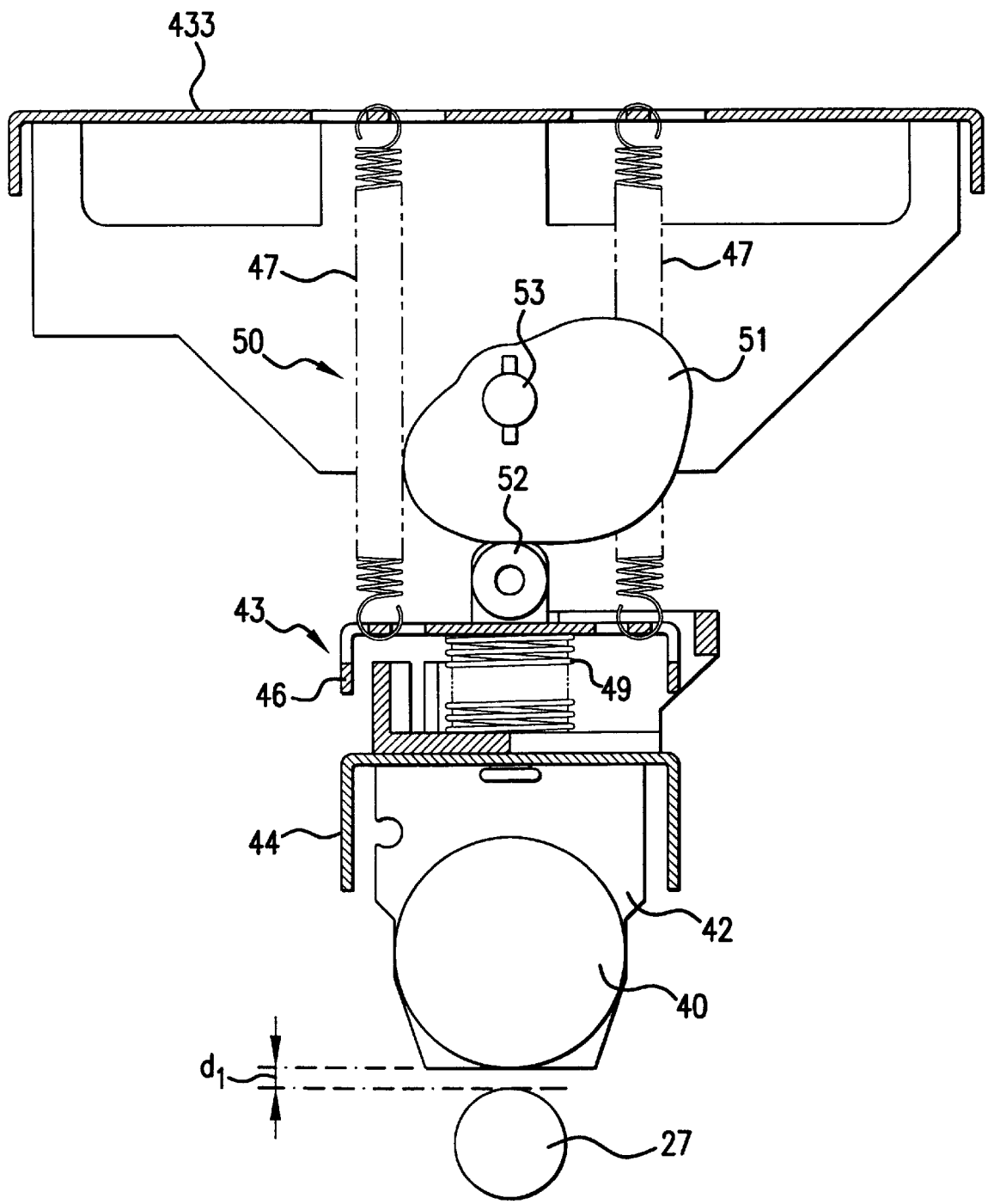
FIGS. 4 through 6 are views showing relative postures between a control position with respect to vertical movement of a heat roller and a control cam.
Figure 5:
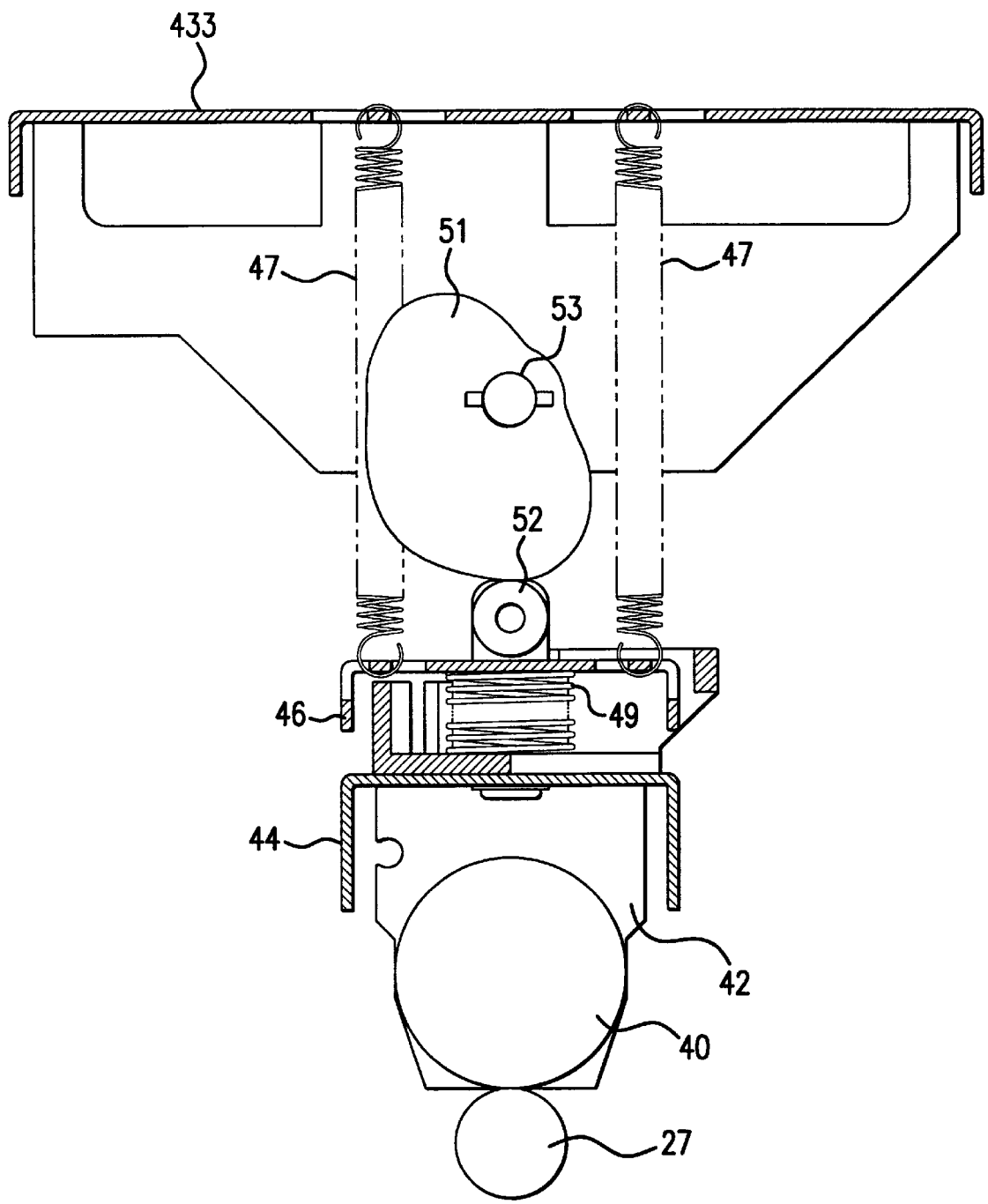
Figure 6:
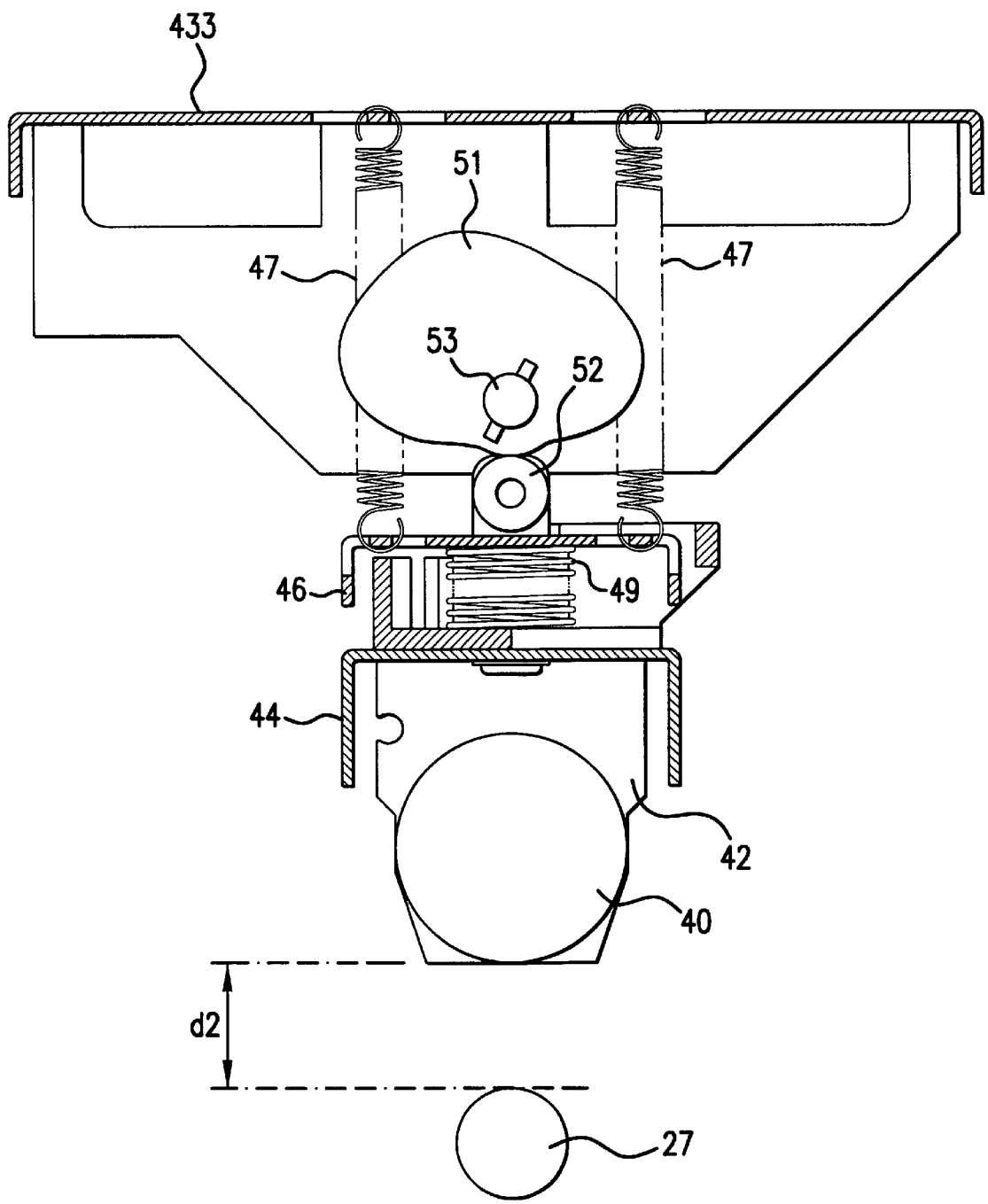

The pending swing mechanism 43 is disposed between the support bracket 42 and an upward frame 433 as shown in FIGS. 4–6, and the support bracket 42 is attached to a lower surface of a sliding table 44. And, the sliding table 44 can move smoothly in the vertical direction.

Above the sliding table 44, a plurality of compression springs 49 is disposed. A movable table 46 made of a sheet metal is placed on a top of the compression springs 49, and is provided between the sliding table 44 and the upward frame 433. And, the movable table 46 is suspended by tension springs 47 disposed to the upward frame 433, and is urged upwardly by the tension springs 47 toward a control cam 51 described later.

The sliding table 44 constantly receives a downwardly directed force by the compression springs 49 provided between the sliding table 44 and the movable table 46 thereabove. The compression springs 49 interposed between the movable table 46 and the sliding table 44 work to press the heat roller 40 against the front surface of the card X.

In order to constitute the ascending and descending drive mechanism 50, as shown in FIG. 4 through FIG. 6, the control cam 51 is disposed above the movable table 46.

With respect to the control cam 51, a cam follower 52 is disposed on an upper surface of the movable table 46, a shaft 53 of the control cam 51 is rotated by a cam driving motor 55, and the shaft 53 is provided with various detecting means relating to a vertical movement of the heat roller 40.

As shown in FIGS. 7(a) through 7(c), a rotation circular disc 54, which includes notches 54a, 54b, 54c at three places on the peripheral edge thereof, is attached to the shaft 53, and on the periphery of the rotation circular disc 54, there is disposed a light sensor 56 formed of two photo interrupters 56a, 56b which are disposed in adjacent to each other. The rotation circular disc 54 and the light sensor 56 cooperate with each other to constitute a position detector for detecting three different stop positions, that is, "heading", "transfer", and "exchange".

The control cam 51 is rotated by the aforementioned cam driving motor, and the rotation circular disc 54 is able to stop at a position where any of these three positions is detected. By the rotational movement of the control cam 51, the heat roller 40 is descended or ascended against the force of the tension springs 47.

Figure 8:
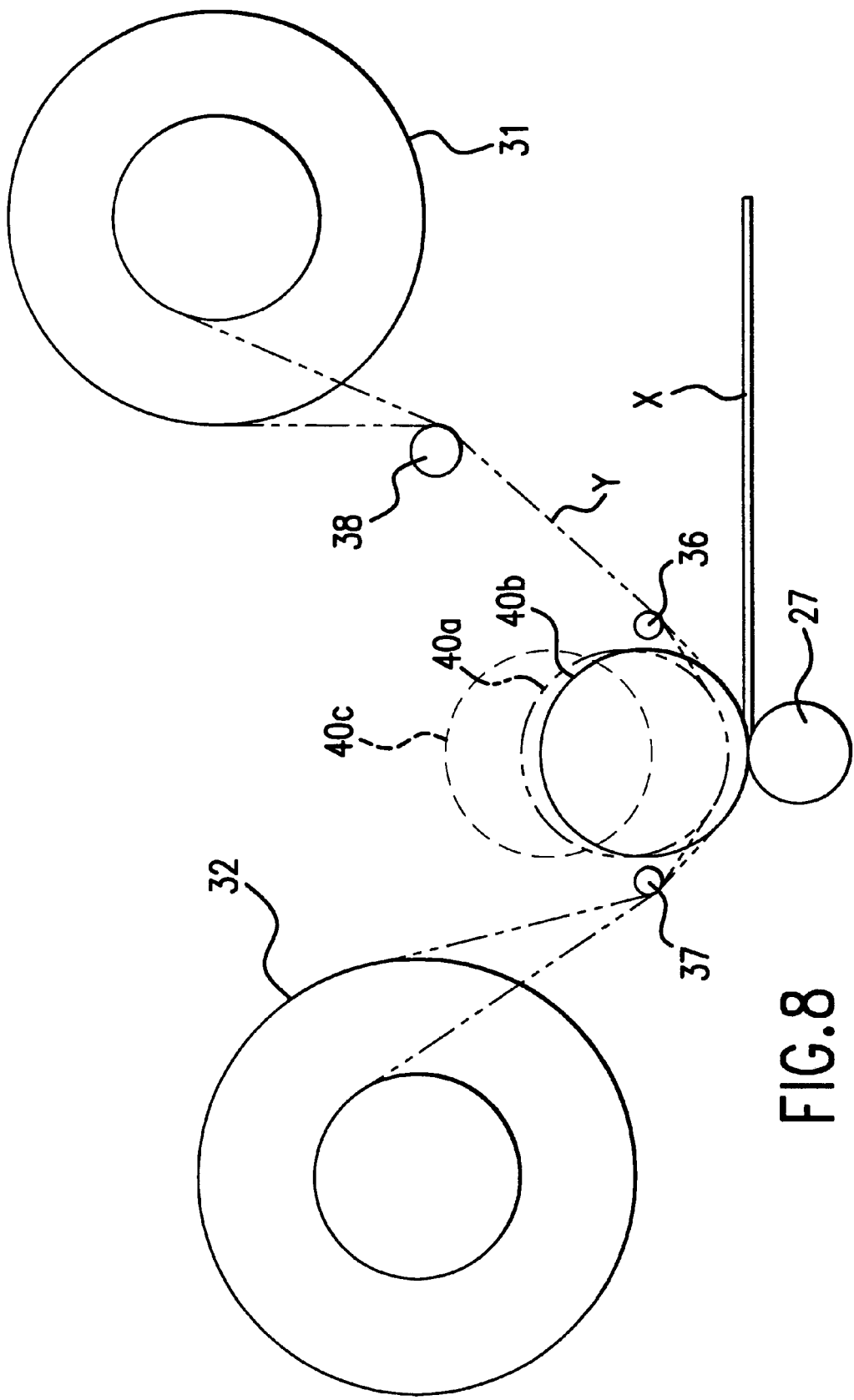
FIG. 8 is a view showing relationship between a transfer motion in the overcoat fixing device and an extending condition of the coat film.

FIG. 8 is a view showing a relationship between a transfer motion in the overcoat fixing device 20 and an extending condition of the film ribbon Y, and when the control cam 51 is made to stand still respectively at the aforementioned stop positions of "heading", "transfer", and "exchange", the control cam 51 controls the heat roller 40 at three different height positions 40a, 40b, 40c shown in FIG. 8. Namely, they are the uppermost position (exchange position) 40c wherein the heat roller 40 does not contact the film ribbon Y to thereby provide a condition that the film ribbon Y can be only extended between the guide pins 36, 37; the lowermost position (transfer position) 40b wherein the heat roller 40 is interposed between the guide pins 36, 37 thereby to press the film ribbon Y against the card X on the platen roller 27; and the intermediate position (heading position) 40a wherein the heat roller 40 is interposed between the guide pins 36, 37 to slightly push down the film ribbon Y and stops near the platen roller 27. Specifically, the heading position 40a is a position wherein the heat roller 40 is spaced away upwardly from the platen roller 27 with a distance d1 (approximately 3 mm) shown in FIG. 4.

The "exchange" position in FIG. 7(c) is detected when the notch 54c of the rotation circular disc 54 is located right above the photo interrupter 56a so that the photo interrupter 56a is ON and the photo interrupter 56b is OFF. Namely, the control cam 51 is situated at the rotational angle position shown in FIG. 6, and the movable table 46 is set in the condition of ascending to the uppermost position by the returning force of the tension spring 47. Accordingly, the heat roller 40 is also located at the uppermost position wherein the heat roller 40 is spaced away upwardly from the platen roller 27 with a distance d2, i.e., the position of not contacting the film ribbon Y.

The "heading" position in FIG. 7(a) is detected when the notch 54a for two sensor areas disposed around the rotation circular disc 54 is located right above the two photo interrupters 56a, 56b disposed adjacent to each other so that both the photo interrupters 56a, 56b are ON. Namely, the control cam 51 is rotated from the aforementioned "exchange" position to the rotational angle position shown in FIG. 4, and while resisting against the tension springs 47, the movable table 46 is pushed down to the intermediate position through the cam follower 52, thereby to locate the heat roller 40 at the position near the platen roller 27 with the distance d1 therebetween (the heading position 40a in FIG. 8).

The "transfer" position in FIG. 7(b) is detected when the notch 54b of the rotational circular disc 54 is located right above the photo interrupter 56b so that the photo interrupter 56a is OFF and the photo interrupter 56b is ON. Namely, the control cam 51 is rotated from the aforementioned "exchange" position or the "heading" position to the rotational angle position shown in FIG. 5, and while resisting against the tension springs 47, the movable table 46 is pushed down to the lowermost position through the cam follower 52. Accordingly, the heat roller 40 abuts against the platen roller 27. The control cam 51 applies a little push-down force to the heat roller 40 to thereby compress the compression springs 49. By work of the compression springs 49, the predetermined pressing force against the platen roller 27 is applied to the heat roller 40.

Figure 3:
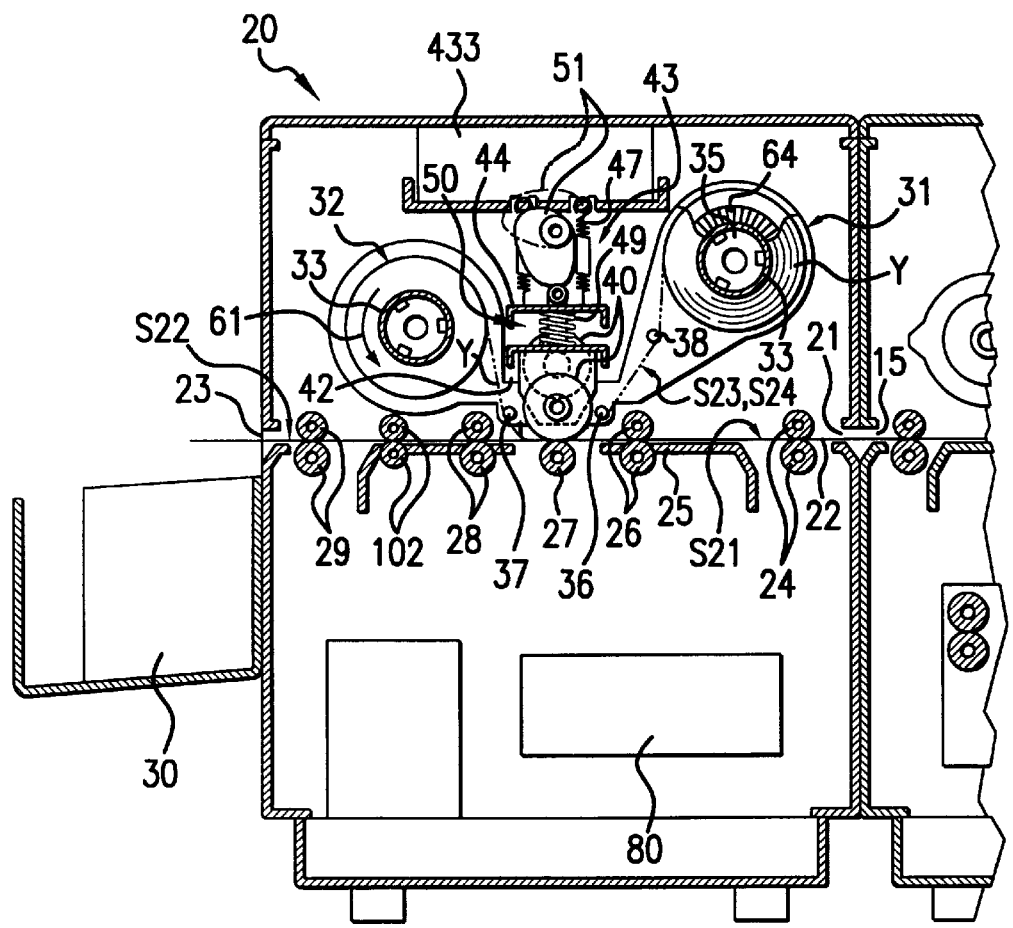
FIG. 3 is an enlarged sectional view of the overcoat fixing device 20 in FIG. 2.

To the take-up bobbin part 32, a film take-up motor 60 provides a rotational driving force in a direction of an arrow 61 in FIG. 3.

Also, the supply bobbin part 31 is set to provide a breaking force with respect to the supply bobbin 33. Accordingly, the film ribbon Y disposed between the take-up bobbin part 32 and the supply bobbin part 31 can be in a tense condition.

A slit circular disc is fixed to one end of a shaft of the bobbin holder 35 of the supply bobbin part 31, and a film take-up sensor 65, described later, formed of a photo interrupter is provided in the slit circular disc. The film take-up sensor 65 is used for checking whether the supply bobbin part 31 rotates, that is, whether the film ribbon Y is extended between the take-up bobbin part 32 and the supply bobbin part 31.

The pair of the inlet side rollers 24, the pair of the first capstan rollers 26, the platen roller 27, the pair of the second capstan rollers 28, and the correcting roller 102 are rotated to be synchronous with each other by a card transfer motor 66 through respective gear trains. Therefore, the card X sent to the pair of the inlet side rollers 24 can be transferred on the passage guide plate 25 through the pair of the first capstan rollers 26, the pair of the second capstan rollers 28, the correcting roller 102, and the pair of the ejection side rollers 29 in order. The pair of the second capstan rollers 28 and the correcting roller 102 constitute transferring means for clamping and transferring the coated card X which is formed of the card X and the film ribbon Y.

In the transfer path 22, there are disposed an inlet card sensor S21 for detecting the card X immediately after the pair of the inlet side rollers 24, and an outlet card sensor S22 for detecting the card X immediately after the pair of the ejection side rollers 29, respectively.

The card X received in the transfer path 22 is accurately sent to a transfer start position of the film ribbon Y by considering a position, where the inlet card sensor S21 detects the rear end of the card X, as a reference position.

In order to distinguish a type of the film ribbon Y extended between the take-up bobbin part 32 and the supply bobbin part 31, mark sensors S23, S24 which detect both the end parts of the film are disposed between the guide pins 36, 38.

Figure 9:
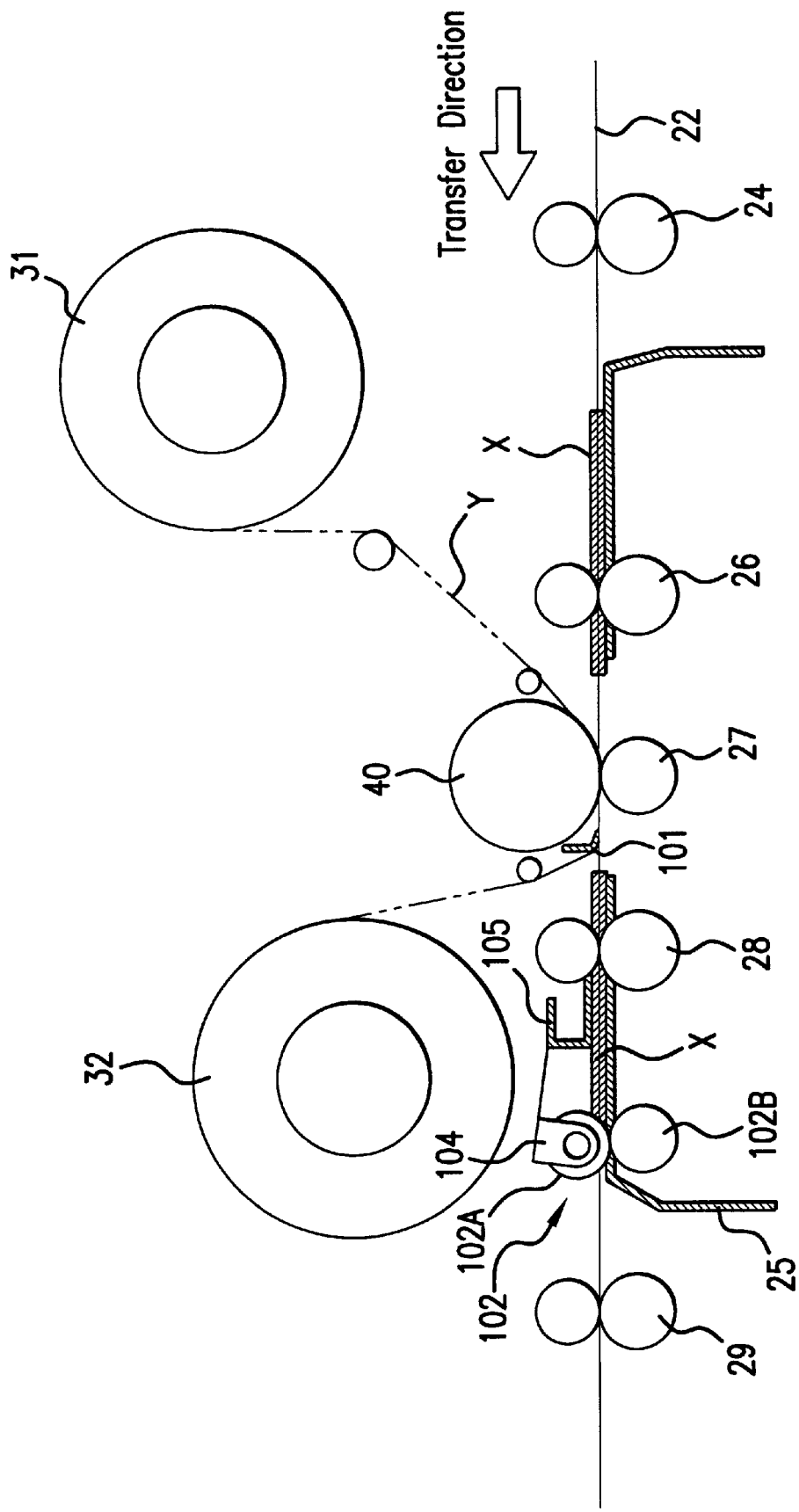
FIG. 9 is a schematic view showing a main part of the overcoat fixing device.
Figure 10:
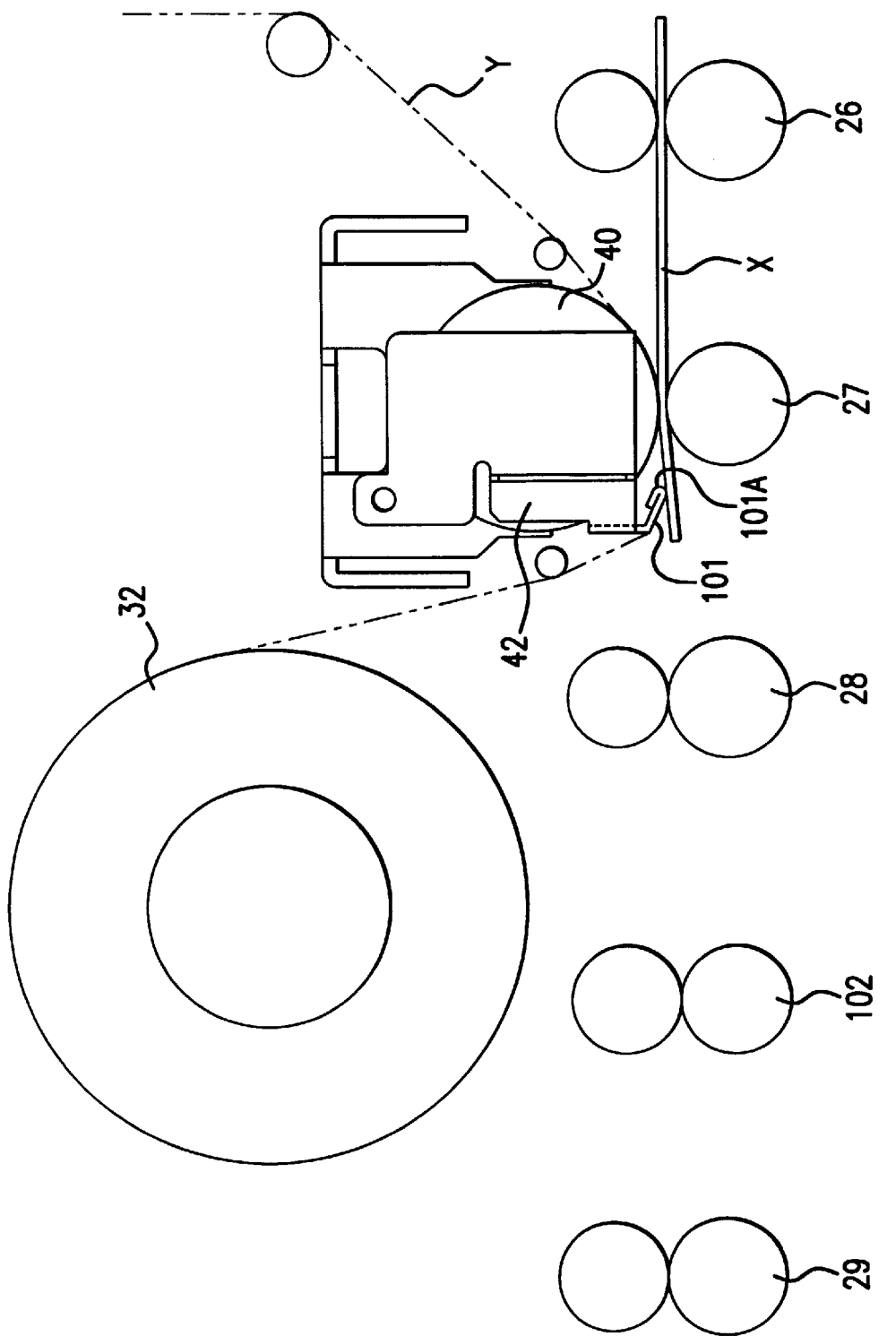
FIGS. 10–12 are schematic structural views showing heating and fixing means and correcting means according to the present invention.

As shown in FIGS. 9 and 10, on a downstream side of a portion clamped by the heat roller 40 and the platen roller 27, there is disposed a peeling plate 101 for peeling off the coat film from a carrier 201 after the coat film 202 is affixed to the card X. The peeling plate 101 is attached to the leg of the support bracket 42, and a distal end 101A thereof is formed with a curvature.

The distal end 101A of the pealing plate is situated to be away from the portion clamped by the heat roller 40 and the platen roller 27 for a predetermined distance in the downstream direction of transferring the card X, and the distance is set to be a distance which is at least necessary for attaching and fixing the coat film 202 on the card X. Then, vertical relative position of the distal end 101A of the peeling plate is, as shown in FIG. 10, set to be deviated to the card X side for a minute size than a contact surface with respect to the film ribbon Y of the card X, which constitutes a transfer surface formed by connecting a clamping portion (supporting portion) by the pair of the first capstan rollers 26 and the clamping portion by the heat roller 40 and the platen roller 27.

Next, works of the peeling plate 101 will be explained; while being transferred to the ejection side, when a forward end of the card X having the front surface on which the coat film 202 is heated and fixed reaches the distal end 101A of the peeling plate, the film ribbon Y is held slightly downwardly. Then, in this condition, the coat film 202 affixed on the card X is separated from the carrier 201, and the card X is transferred to the downstream direction and the separated film ribbon Y is taken up. Thus, the film ribbon Y is affixed securely in the condition that the separated portion thereof is shaped along the edge of the card X. Further, since the peeling position in accordance with transferring the card X is sufficiently separated from a heating and pressing position, after the predetermined cooling time has elapsed, the affixing portion is separated from the carrier 201 in the condition that the coat film 202 is securely attached and fixed. Therefore, the card X which is excellent in durability can be achieved.

In the aforementioned embodiment, the peeling plate 101 is attached to the leg of the support bracket 42 and is moved vertically synchronously with the heat roller 40; however, a peeling roller 101B may be transferred vertically to be independent from the vertical movement of the heat roller 40. Namely, as shown in FIGS. 15(a) through 15(d), the heat roller 40 and the peeling roller 101B keep pressing the card X from a time point when the coat film 202 is fixed onto the card X by heating to a time point when the rear end of the card X reaches the heat roller 40 (FIG. 15(a)); thereafter, only the heat roller 40 is separated from the card X (FIG. 15(b)). Then, the rear end of the coated card X reaches the peeling roller 101B (FIG. 15(c)), and immediately thereafter, the peeling roller 101B is moved upwardly (FIG. 15(d)).

Also, although the peeling plate 101 is fixed to the leg of the support bracket 42 in this embodiment, it may be attached adjustably in the transferring direction of the card X.

Figure 11:
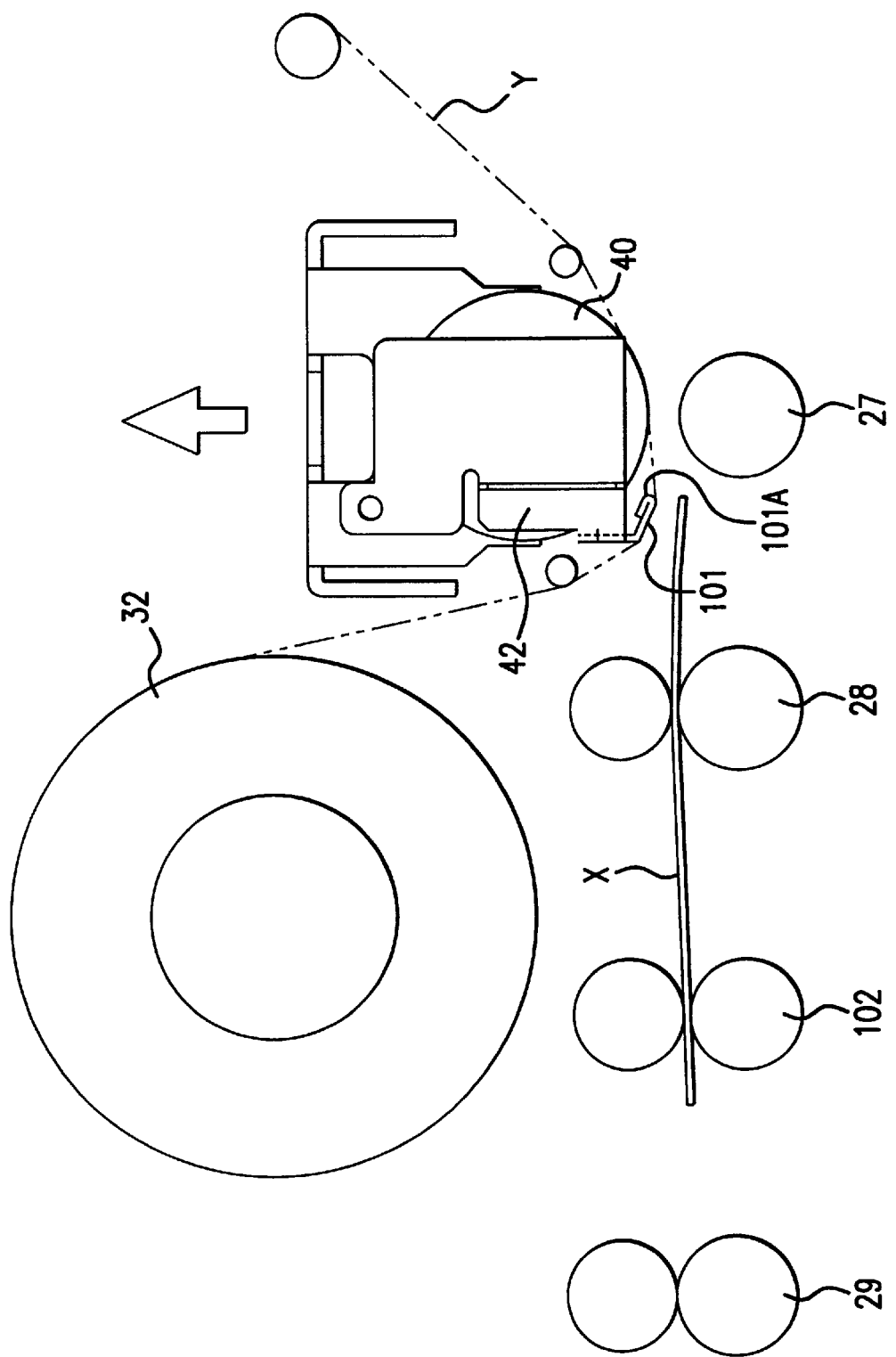
Figure 12:
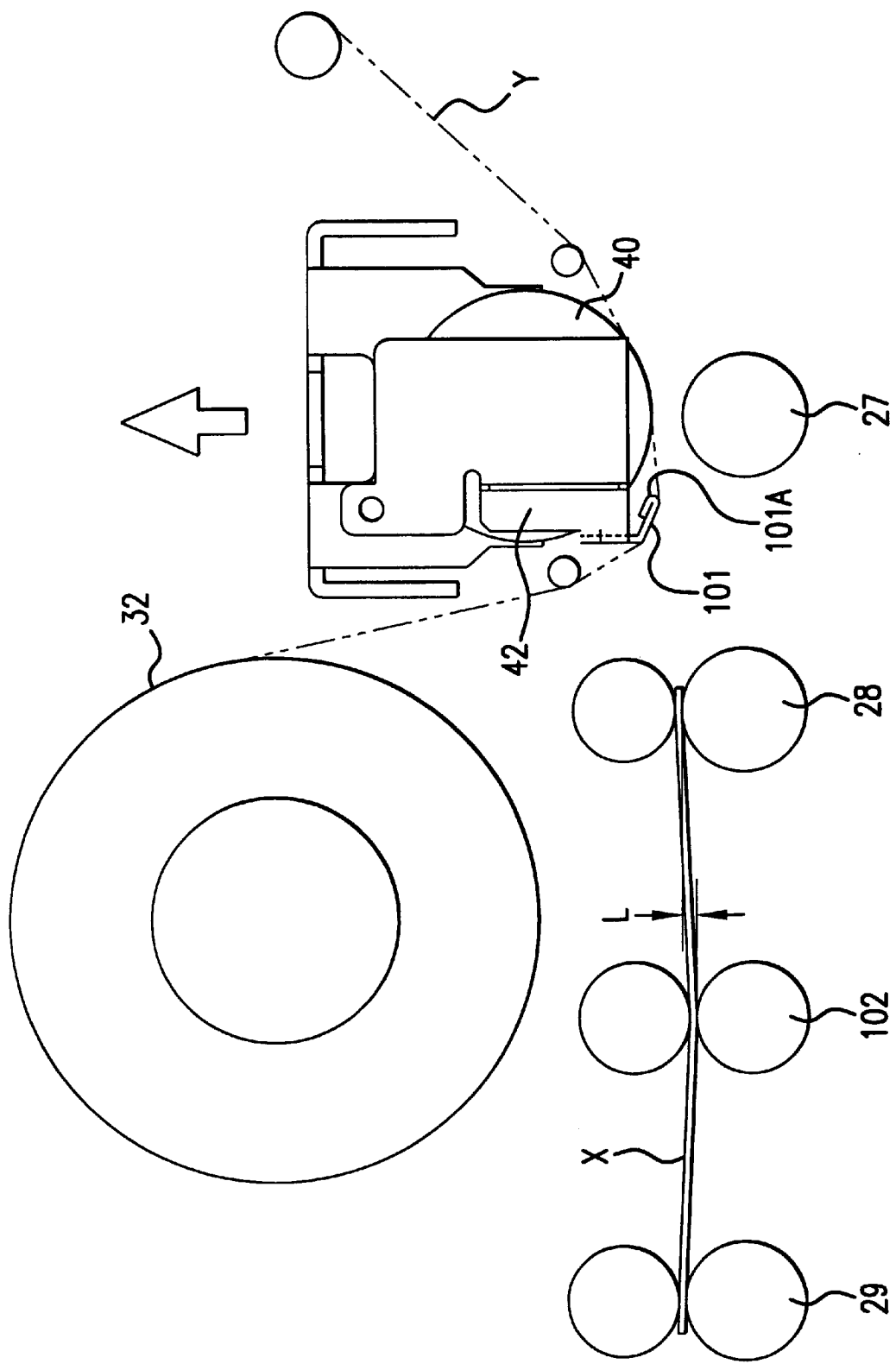

FIG. 9 is a schematic view showing a main part of the overcoat fixing device 20, and FIG. 10, FIG. 11, and FIG. 12 are schematic structural views showing heating and fixing means and shape correcting means according to the present invention.

As described above, between the pair of the second capstan rollers 28 and the pair of the ejection side rollers 29, there is provided the correcting roller 102 for correcting a shape of the coated card X described later.

The correcting roller 102 is formed of upper and lower rollers 102A, 102B, and the lower roller 102B is located lower for a minute size L shown in FIG. 12 than the transfer surface connecting the respective clamping portions of the pair of the second capstan rollers 28 and the pair of the ejection side rollers 29. The upper roller 102A is pressed onto the lower roller 102B by a leaf spring (elastic means) 104.

Both forward and rear ends of the coated card X which has been heated and fixed are respectively clamped by the pair of the second capstan rollers 28 and the pair of the ejection side rollers 29, and the card X is stopped for a predetermined time in the condition that an approximate center part of the card X is pressed toward a lower roller 102B side by the upper roller 102A of the correcting roller 102, so as to be cooled while being stopped. The coated card X, which has been curved by being pressed and heated by the heat roller 40 as described above, is bent and held by the upper roller 102A in a bending direction opposite to the curve direction at a cooling step after heating to correct the curve.

Although the lower roller 102B of the correcting roller 102 is fixed and the upper roller 102A is urged downwardly by the leaf spring 104 to press the card X for bending in the aforementioned embodiment, it may be structured such that the respective rollers or one of the rollers of the correcting roller 102 may be moved vertically by using a driving source, such as a motor or solenoid. By vertically moving the roller for pressing the card x by using the driving source as described above, correction in accordance with the curve direction of the card or appropriate correction in accordance with a degree of the curve of the card can be made. In this case, information regarding the curve direction of the card and the degree of the curve may be inputted from an operation panel 1A of the sublimation type full-color printer 1 shown in FIG. 13.

Figure 16A:
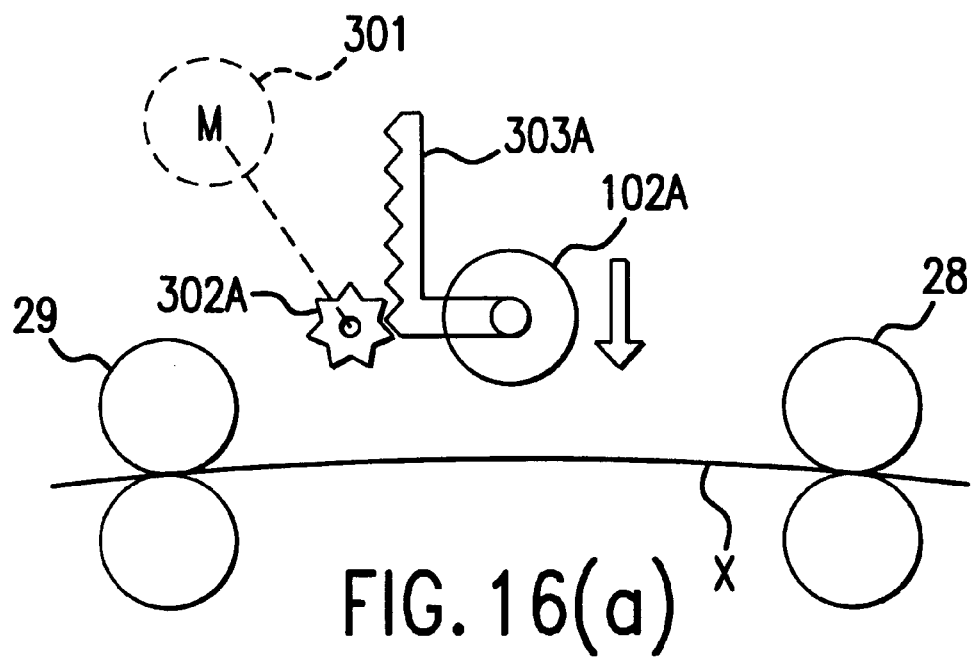
FIG. 16(a), FIG. 16(b), FIG. 17(a), FIG. 17(b), FIG. 18(a) and FIG. 18(b) show other embodiments of means for correcting the card according to the present invention.
Figure 16B:
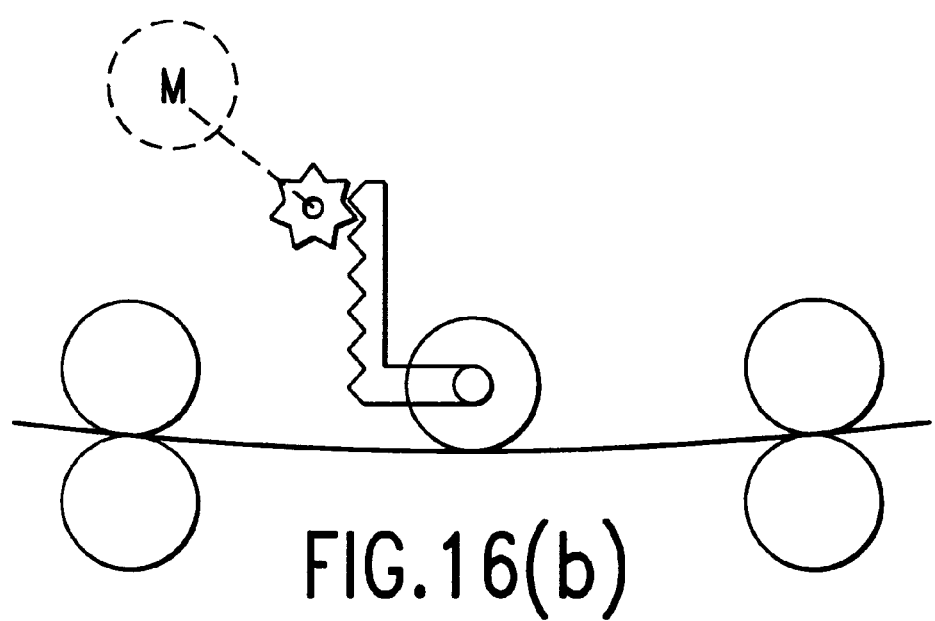

More specifically, as shown in FIGS. 16(a), (b), a swing rack 303A to which the upper roller 102A is attached, a fixed pinion 302A engaging the swing rack 303A, and a driving motor 301 for rotating the fixed pinion 302A are provided. Information about the degree of the curve of the card is discretionarily inputted from the operation panel 1A of the sublimation type full-color printer 1, and transfer amount of the upper roller 102A is controlled by the driving motor 301 based on the inputted information, so that the bending amount (displacement amount) of the card X by the upper roller 102A is adjusted.

Figure 17A:
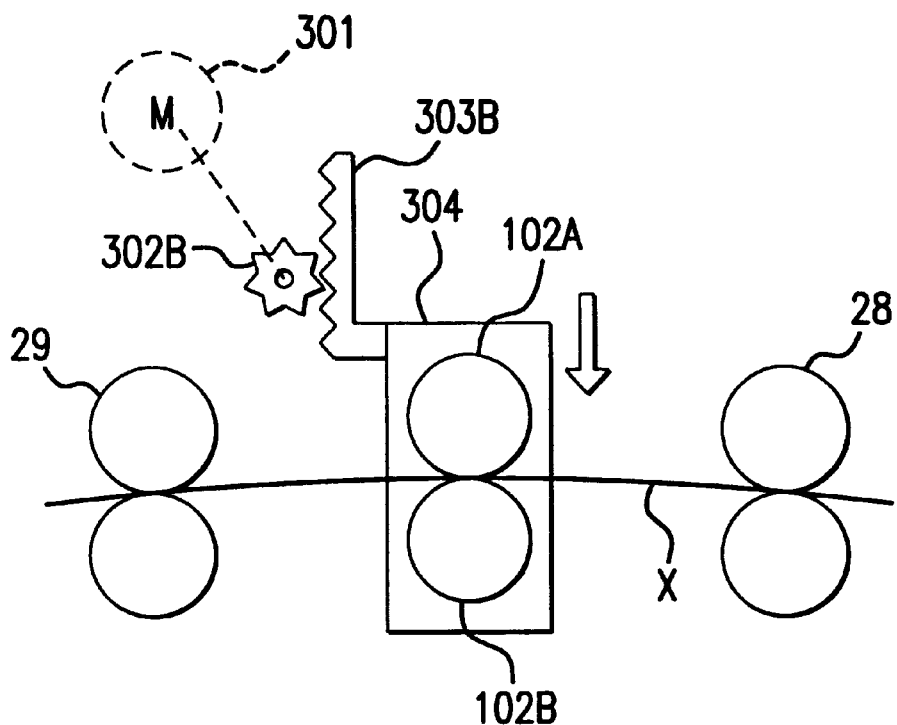
Figure 17B:
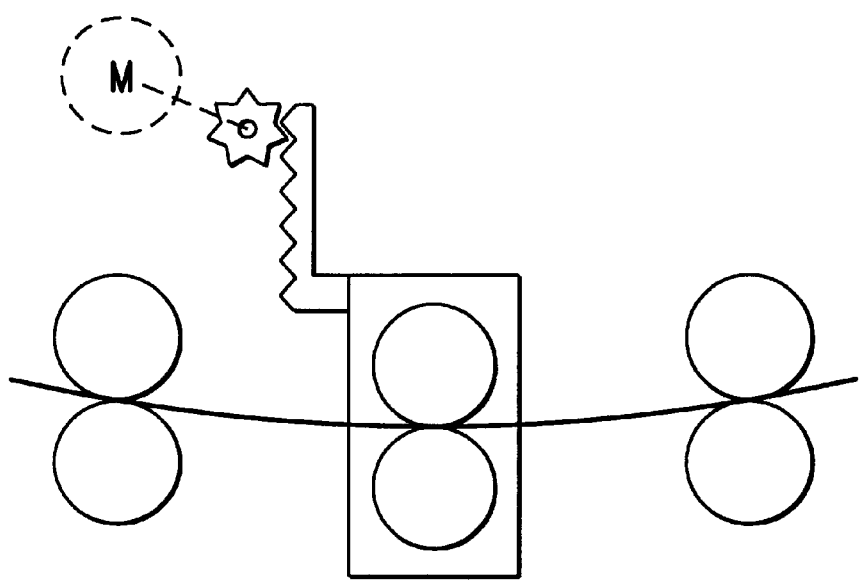

Also, as shown in FIGS. 17(a) and (b), the upper roller 102A and the lower roller 102B are made into a unit, and the unit 304 is attached to a swing rack 303B, so as to constitute a structure in which the upper roller 102A and the lower roller 102B are moved vertically by the fixed pinion 302B and the driving motor 301. While information regarding the degree of the curve of the card is inputted from the operation panel 1A of the sublimation type full-color printer 1, the curve direction of the card is chosen and inputted, and the driving motor 301 controls the position of the unit 304 based on the respective inputted information. For example, in case the card is curved greatly to the coat film fixing side, the driving motor 301 moves the unit 304 such that the clamping portion of the upper roller 102A and the lower roller 102B is located downwardly away from a straight line connecting between the respective clamping portions of the pair of the second capstan rollers 28 and the pair of the ejection side rollers 29. In case the card is curved greatly to the side different from the coat film fixing side, the driving motor 301 moves the unit 304 such that the clamping portions of the upper roller 102A and the lower roller 102B are located upwardly away from a straight line connecting between the clamping portions of the pair of the second capstan rollers 28 and the pair of the ejection side rollers 29.

Figure 18A:
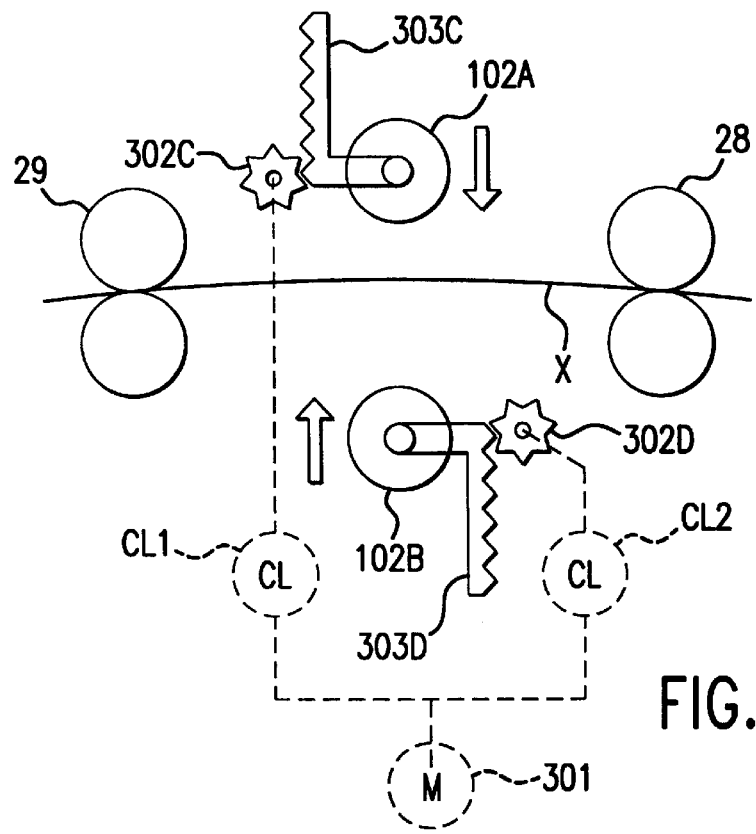
Figure 18B:
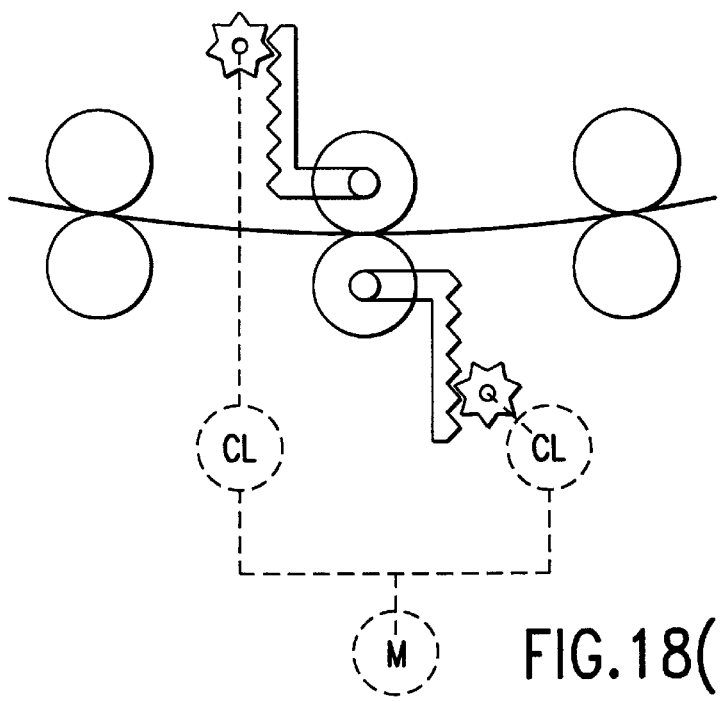

Further, as shown in FIGS. 18(a) and (b), the driving motor 301 is provided, and at the same time, the upper roller 102A and the lower roller 102B are respectively independently provided; also, swing racks 303C, 303D, fixed pinions 302C, 302D, and clutches CL1, CL2 for respectively transmitting or isolating drive of the driving motor 301 to the upper roller 102A and the lower roller 102B are provided.

While information regarding the degree of the curve of the card is inputted from the operation panel 1A of the sublimation type full-color printer 1, the curve direction of the card is chosen and inputted, and the positions of the upper roller 102A and the lower roller 102B may be respectively controlled by the driving motor 301 and the respective electromagnetic clutches CL1, CL2 based on the respective inputted information.

Incidentally, as shown in FIGS. 16(a) and (b) and FIGS. 18(a) and (b), by retreating the upper roller 102A and the lower roller 102B from the transfer path 22 except when pressing the card X, the card X can be smoothly transferred.

Figure 13:
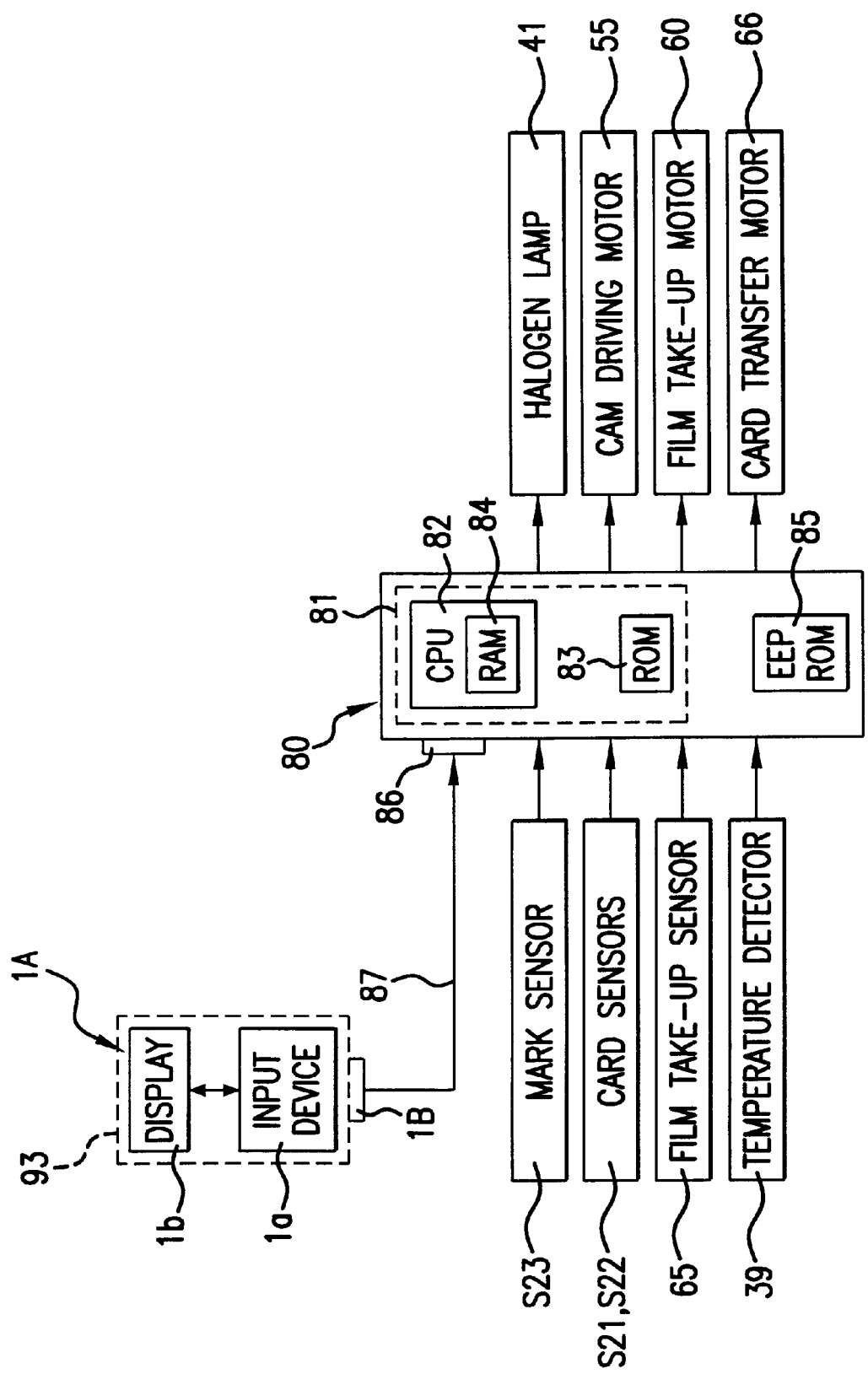
FIG. 13 is a control block diagram of the overcoat fixing device.

As shown in a block diagram of FIG. 13, a control device 80 is formed of a control section 81, as a main part, which includes a microprocessor CPU 82, a memory ROM 83, and memory RAM 84 to constitute as a micro computer, and the control device 80 is provided with a programmable ROM (EEPROM) 85 on which deleting and writing are allowed, and a communication function section 86 connected to a communication function section 1B of the printer side through a line 87. Incidentally, on the printer side, as a part of film type setting means 93, the operation panel 1A including an input device 1a and a liquid crystal display 1b is provided.

To input ports of the control section 81, there are inputted signals from the input device 1a provided together with the liquid crystal display 1b in the operation panel 1A of the sublimation type full-color printer 1, the mark sensors S23, S24, the card sensors S21, S22, the film take-up sensor 65, and the temperature detector 39 for monitoring a surface temperature of the heat roller 40. Also, the halogen lamp 41 of the heat roller 40, the cam driving motor 55 as pressing means, the film take-up motor 60, the card transfer motor 66 and the like are connected to output ports of the control section 81. Further, the control section 81 is structured to receive an indicated film type from the operation panel 1A of the printer 1 through the communication function section 1B, the line 87 and the communication function section 86.

The control section 81 constitutes a memory control section for storing a heating temperature of the heating means and a transfer velocity of the card in accordance with the type of the film ribbon Y to be used. In the ROM 83, a temperature set table and a velocity set table are stored, and in the temperature set table and the velocity set table, there are stored appropriate heating temperature T of the heat roller 40, and appropriate transfer velocity V of the card X, for every type of the film ribbon Y.

At the time of actuation, based on the set value of the temperature provided as described above, the surface temperature of the heat roller 40 detected from the temperature detector 39 is monitored, and by controlling the halogen lamp (heater) 41 to be ON or OFF, the surface temperature of the heat roller 40 is maintained at the provided set value temperature T.

Supply of electricity to the halogen lamp 41 is allowed only when the light sensor (position detector) 56 of the ascending and descending drive mechanism 50 detects "transfer", "heading" or "exchange" position. Other than that, that is, in case the heat roller 40 is not located at the lowermost transfer position 40b, the intermediate heading position 40a, or the uppermost exchange position 40c, this electrifying is prohibited. Namely, in case the heat roller 40 is moving, electricity is turned OFF in order to prevent breakage of the halogen lamp 41.

After the card X is positioned at the transfer start position of the film ribbon Y, a transfer start signal ST is issued from the CPU 82 to operate ascending and descending control, card transfer control, and film transfer control.

As the ascending and descending control, by cooperating with the light sensor (position detector) 56 as shown in FIGS. 7(a)–7(c), actuation and stop of the cam driving motor 55 are controlled. Namely, in case of fixing operation, a rotation order is given to the motor 55 for driving the control cam 51 such that the heat roller 40 is moved in a vertical direction by the control cam 51.

In case of transferring the card, after the card X is positioned at the transfer start position of the film ribbon Y, the transfer start signal ST is issued from the CPU 82 to operate the card transfer control.

The card transfer control is such that in case of transferring, based on transfer velocity data which is read and provided as described above, the card transfer motor 66 is controlled to transfer the card X at an average velocity V.

With regard to the operation of the overcoat fixing device, when a power source of the heat roller 40 is turned ON to warm up to a set temperature, the fixing operation is started. Then, the card X is received from the printer 1, and the card X is transferred to the transfer position as described in the following. Namely, after the rear end of the card X passes through the inlet card sensor S21, the card X is once backed to a position wherein the inlet card sensor S21 is completely shielded from the light. Thereafter, the card X is again transferred toward the heat roller 40, and the inlet card sensor S21 detects the rear end of the card X, which is considered as a reference position. Accordingly, an error, such as a backlash, is eliminated. A pulse number which should be applied to the card transfer motor 66 by considering this reference position as a start point is calculated, and the transfer position wherein the forward end of the card X is placed on the platen roller 27 is obtained. Then, the card X is transferred to the transfer position.

Next, when the card X is transferred to the transfer position of the card X, the film type is checked so as to set a condition for transferring the film.

In case the film ribbon Y is an ordinary hologram, the heat roller 40 is moved to the lowermost transfer position 40b. Incidentally, while the heat roller 40 is moving, supply of electricity to the halogen lamp 41 is prohibited.

Subsequently, a transfer condition is set from the film type. Namely, the control section 81 transfers the card based on the set velocity V of the film type from the velocity set table.

Transferring is started, and while the card transfer motor 66 repeats transferring and stopping, the card X is transferred at the average velocity V. When transferring of a predetermined area is finished without detecting a detection mark during the transferring, the heat roller 40 is returned to the uppermost exchange position 40c to stand by for a subsequent transferring operation. Also, in case of detecting the detection mark, it is decided that the ordinary hologram coat film comes to an end, or different type of the film ribbon Y is set, and an error signal is issued.

Thereafter, in order to prevent tailing, the card X is transferred for a very little amount (approximately 10 mm), and stopped for a period of time for cooling and fixing the coat film 202, which is not fixed to the card X and is apt to be peeled by heating, and the carrier 201. Subsequently, the film Y is taken up for a predetermined amount by the take-up motor 60. Then, the card transfer motor 66 is turned ON to eject the card X. Here, "tailing" means a phenomenon wherein in case only the same area as the card is taken out and thermally melt-adhered to be transferred on the front surface of the card, at an end of the transfer step, the hologram transfer layer is not finely cut at the rear end of the card, and is excessively bonded in the shape of tailing.

Namely, when viewed from a film side, it is a phenomenon wherein the hologram transfer layer is peeled off the carrier to an area outside the card due to heat; and when viewed from the card side, it is a phenomenon wherein a small pleat is created at the rear end of the card.

Figure 14:
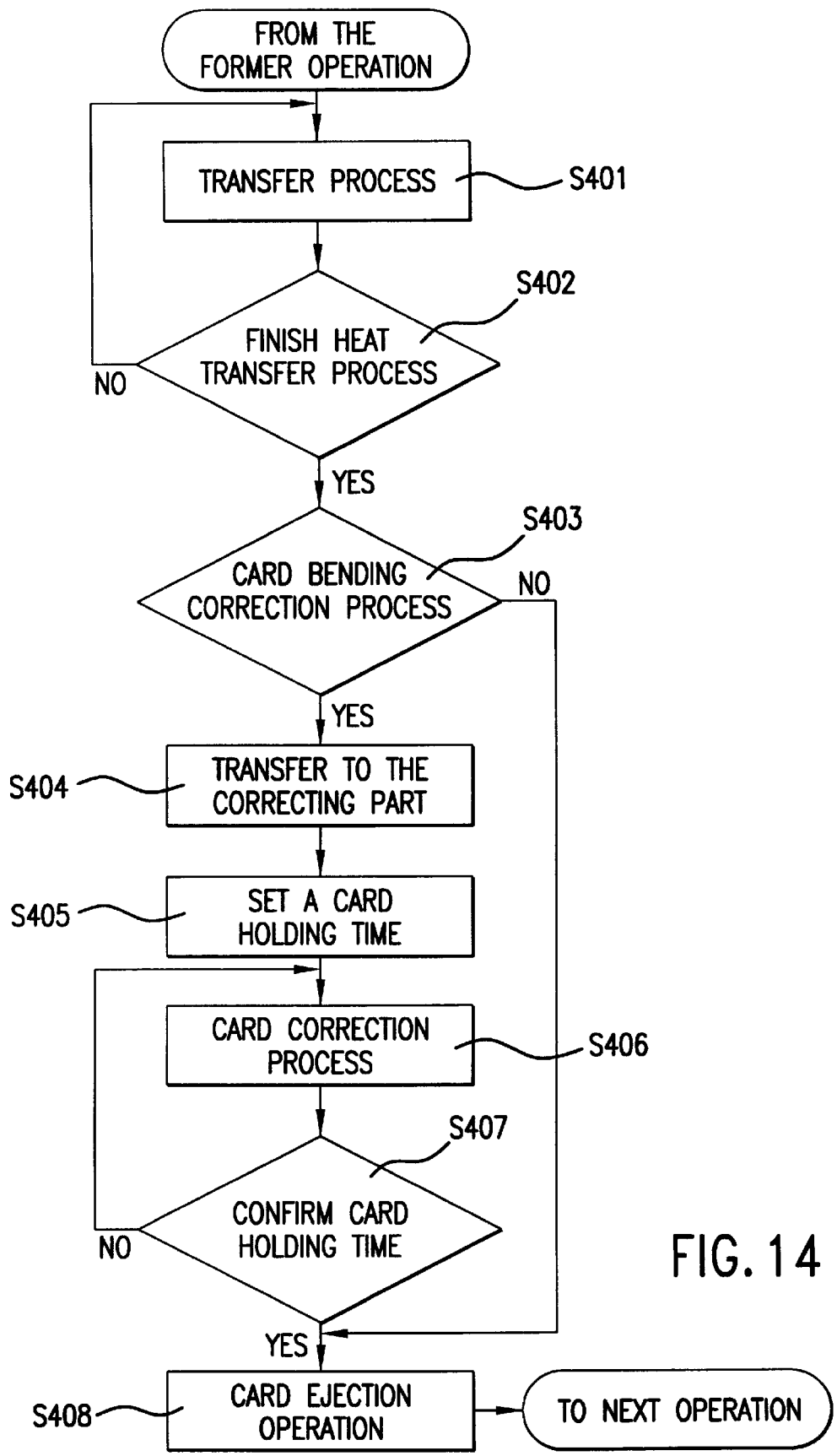
FIG. 14 is a flow chart showing a correction control of the card.
Figure 15A:
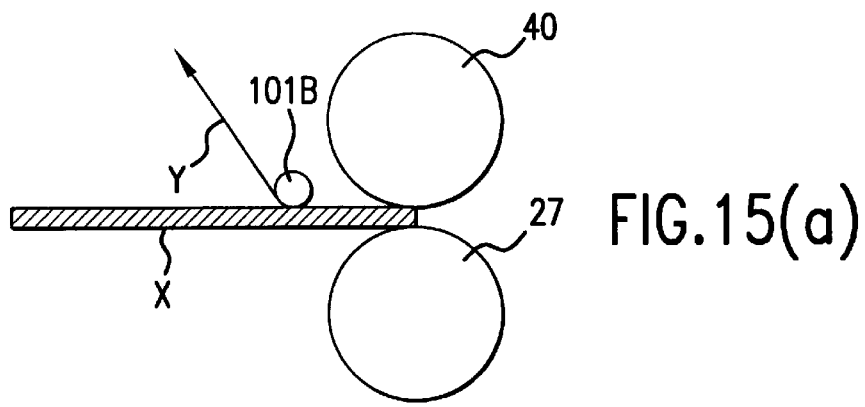
FIGS. 15(a)–(d) are schematic structural views showing another embodiment of means for peeling off an overcoat.
Figure 15B:
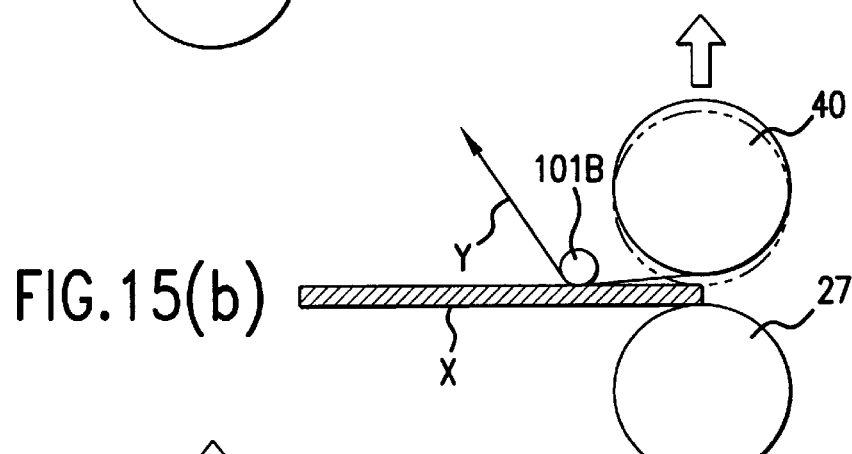
Figure 15C:
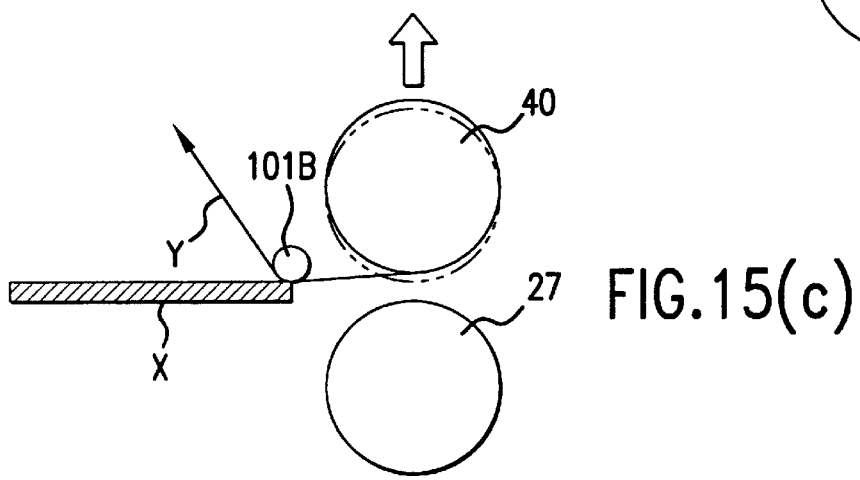
Figure 15D:
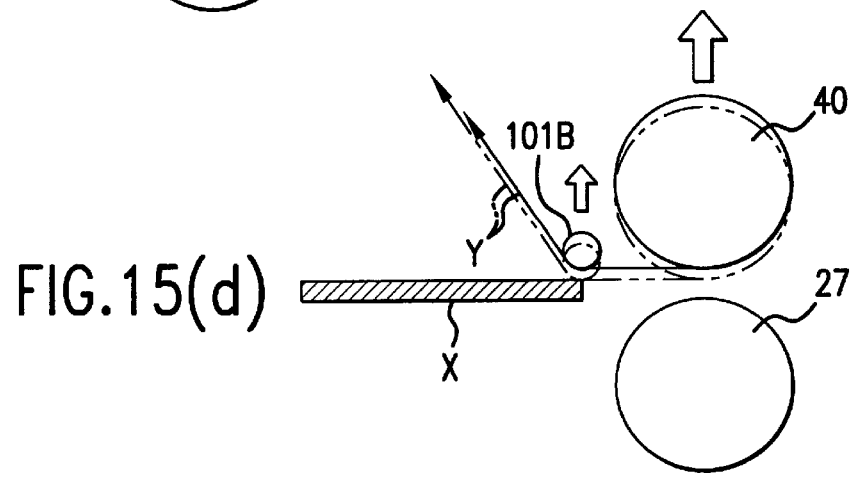

FIG. 14 is a flow chart showing peeling of the film ribbon Y and a correction control of the shape of the card X, and the shape correction control for the card X is explained.

The card X is clamped by the heat roller 40 and the platen roller 27 in the pressed condition, and while being transferred to the ejection side, the film ribbon Y is heated and fixed on the front surface of the card as described above. After the card reaches the peeling actuation part 101A, the film ribbon Y is bonded while being pressed at the peeling actuation part 101A, and the portion which is not bonded is separated from the card X and the card X is transferred to the downstream direction (S401).

During the aforementioned transferring process, since the card X is pressed and heated by the heat roller 40, the card is deformed to curl. When the transfer process is finished (S402), on the operation panel, a user selects whether the bending correction by the correcting roller 102 is operated; here, a predetermined card holding time at the correction roller 102 is selected. When the bending correction is chosen to operate (S403), the card X is transferred in the condition of being clamped by the pair of the second capstan rollers 28, the correcting roller 102 and the pair of the ejection side rollers 29 as shown in FIG. 12, the selected holding time is set (S405), and the card X is stopped and held in this condition (S406, S407). Therefore, during a cooling step after heating, the coated card X which has been deformed in the curl shape during the transfer process is held in a shape with a bending direction opposite to the deformed shape, and the curl deformation is corrected meanwhile. Then, after the set card holding time has elapsed, the card X is ejected from the ejection port 23 (S408).

What is claimed is:

1. An overcoat fixing device for fixing a coat film on a front surface of a recording medium by heating, comprising:

transferring means for transferring and holding the recording medium along a transfer path;

fixing means provided in the transfer path and fixing the coat film to the recording medium; and pressing means provided in the transfer path away from the fixing means and pressing one surface of the recording medium with the coat film thereon in a direction to correct bending of the recording medium, said pressing means pressing during a predetermined cooling period in which the recording medium is held in the transfer path so that said recording medium with the coat film sent from the fixing means by the transferring means is pressed by the pressing means for a predetermined time while stopping to thereby correct a posture of the recording medium with the coat film.

2. An overcoat fixing device according to claim 1, wherein the pressing means presses a surface on a curved direction side of the recording medium on which the coat film is fixed.

3. An overcoat fixing device according to claim 2, further comprising selecting means for selecting a surface to be pressed in accordance with the curved direction of the recording medium on which the coat film is fixed.

4. An overcoat fixing device according to claim 2, further comprising means for adjusting a displacement amount of the recording medium by the pressing means in accordance with a degree of a curve of the recording medium on which the coat film is fixed.

5. An overcoat fixing device according to claim 1, wherein the pressing means is formed of a pressing member for contacting the one surface of the recording medium, and an elastic member for urging the pressing member to the one surface of the recording medium.

6. An overcoat fixing device according to claim 5, wherein the pressing member is formed of a roller.

7. An overcoat fixing device according to claim 1, wherein the pressing means is formed of a pressing member for contacting the one surface of the recording medium, and driving means for moving the pressing member vertically.

8. An overcoat fixing device according to claim 1, wherein the transferring means includes first roller means for supporting a forward end side in a transferring direction of the recording medium stopped at the predetermined position, and second roller means for supporting a rear end side, said pressing means being located between the first roller means and the second roller means, said recording medium being pressed between the first roller means and the second roller means.

9. An overcoat fixing device according to claim 1, further comprising means for selecting a card holding time in which the recording medium with the coat film is held by the transferring means and pressed by the pressing means.

10. An overcoat fixing device according to claim 1, wherein said transferring means includes a plurality of rollers spaced apart from each other along the transfer path, said pressing means being located between two of the rollers to press the recording medium held by the two of the rollers in a direction perpendicular to the transfer path.

* * * * *